(12) United States Patent
Peirce, Jr. et al.

(10) Patent No.: US 6,542,992 B1
(45) Date of Patent: Apr. 1, 2003

(54) CONTROL AND COORDINATION OF ENCRYPTION AND COMPRESSION BETWEEN NETWORK ENTITIES

(75) Inventors: Kenneth L. Peirce, Jr., Barrington, IL (US); Yingchun Xu, Buffalo Grove, IL (US); Timothy Glenn Mortsolf, Lisle, IL (US); Matthew Harper, Arlington Heights, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/237,555

(22) Filed: Jan. 26, 1999

(51) Int. Cl.[7] .............................. H04L 9/00; G06F 15/16
(52) U.S. Cl. ...................... 713/153; 709/202; 380/269
(58) Field of Search .......................... 713/153; 709/105, 709/202, 235; 380/269

(56) References Cited

U.S. PATENT DOCUMENTS

| 5,528,595 | A |   | 6/1996  | Walsh et al. ............. 370/85.13 |
| 5,657,452 | A |   | 8/1997  | Kralowetz et al. ...... 395/200.57 |
| 6,061,650 | A | * | 5/2000  | Malkin et al. ............... 370/401 |
| 6,118,768 | A | * | 9/2000  | Bhatia et al. ................ 370/254 |
| 6,160,804 | A | * | 12/2000 | Ahmed et al. ............... 370/349 |
| 6,163,843 | A | * | 12/2000 | Inoue et al. ................. 709/225 |
| 6,272,129 | B1| * | 8/2001  | Dynarski et al. ............ 370/352 |

OTHER PUBLICATIONS

Request for Comments (RFC) 2002, C. Perkins, editor (Oct., 1996).
Request for Comments (RFC) 2393, dated Dec. 1998.
Mobile IP Design Principles and Practices, Charles E. Perkins, Addison–Wesley Wireless Communications Service (1998), pp. 58–89.

* cited by examiner

Primary Examiner—Gilberto Barron
Assistant Examiner—Douglas J. Meislahn
(74) Attorney, Agent, or Firm—McDonnell Boehnen Hulbert & Berghoff

(57) ABSTRACT

Two network entities allocate the performance of encryption and compression algorithms amongst each other in a controlled and coordinated manner so as to avoid unnecessary duplication of encryption and compression at different protocol layers and an associated waste of CPU power. For example, a first network entity performs both encryption and compression at the IP layer, and instructs the second network entity to disable PPP-layer encryption and compression. In a wireless networking example of the invention, the first network entity is a home agent (e.g., a router) for a wireless communications device and the second network entity is a foreign agent (e.g., a network access server) providing network access for the communications device. The foreign agent terminates a Point-to-Point Protocol (PPP) session with the communications device, but implements (or does not implement) PPP-layer compression and encryption algorithms under the supervision and control of the home agent.

27 Claims, 1 Drawing Sheet

US 6,542,992 B1

CONTROL AND COORDINATION OF ENCRYPTION AND COMPRESSION BETWEEN NETWORK ENTITIES

BACKGROUND OF THE INVENTION

A. Field of the Invention

This invention relates to the field of telecommunications and more particularly to the control of encryption and compression of data by network elements.

B. Description of Related Art

Data compression is a known technique for reducing the size of a file or the size (i.e., length) of a data stream. Data compression is achieved by eliminating unnecessary information, such as redundant data, and by substituting symbols to represent repeated data patterns. Data compression therefore allows a data stream to transmitted with fewer symbols, and thus faster, over a communications link with a given, finite bandwidth.

Encryption is technique for transforming data into an unreadable form, such as by hiding the repetition of data patterns, to reduce the likelihood of an outsider deducing the contents of a data stream. Encryption promotes privacy and security of data transfer, particularly when public or otherwise unsecure networks are used as a transmission medium.

Telecommunications equipment typically have the capability of performing both data compression and encryption. Generally speaking, it is important for a data stream to be compressed prior to being encrypted. If data is encrypted prior to being compressed, the compression will not be as effective because the repetition of bit patterns will no longer exist in the encrypted stream that is fed into the data compression mechanism.

Compression and encryption can be performed in the modules that implement the protocols at different layers or levels in the OSI reference model. For example, the Point-to-Point Protocol (PPP) includes data compression and encryption features that can be applied to the data stream by a PPP software module or stack. In addition, encryption and data compression are features that can be implemented in higher level Internet Protocol (IP) software modules or stacks.

The endpoints of the compression and encryption sessions are the entities that are burdened with these increased processing requirements. The remote terminal, e.g., in a wireless communications scenario, a portable wireless communications device, is always burdened with compression and encryption processing tasks, and this is virtually unavoidable since compression and encryption are considered vital for secure and efficient data transfer over a radio link. The other burdened element is the network element or entity that terminates the PPP link (if encryption and compression at the PPP level is performed) and the network element or entity that terminates an IP session. Encryption and compression, at either the PPP or the IP level, requires considerably more CPU processing power on a per-packet basis than standard routing operations, and in many situations can be a significant processing load on the network entities.

When two different network entities process protocols at different layers, and when such layers offer both compression and encryption features, a problem arises as to how to control and coordinate the implementation of such compression and encryption between the two network entities. Ideally compression and encryption should be performed only once, and in that order, to avoid unnecessary consumption of processing power in the network entities. The present invention addresses this problem and provides for methods for two different network entities to coordinate which one will implement a data compression algorithm and which will implement an encryption algorithm.

The present invention will be described herein in the context of a wireless networking example in which the two network entities consist of a foreign agent and a home agent (see RFC 2002 for further details). The foreign agent in this example is a network access server. The home agent is a router. It will be appreciated that the invention can be implemented with other types of network entities and in other network environments.

SUMMARY OF THE INVENTION

The present invention provides for methods for controlling the compression or encryption of data exchanged between two different network entities and a remote communications device. The two different network entities comprise a first network entity (such as a home agent) and a second network entity (such as a foreign agent). In a representative embodiment, the first network entity will generally be suited to process encryption or compression at one level or layer (e.g., at the IP layer), and the second network entity will be suited to process the encryption or compression at a second, different layer or level, such as at the PPP layer. Thus, both network entities have a central processing unit capable of performing at least one data compression algorithm on the data and one encryption algorithm on the data.

The method includes the step of sending a message from the first network entity to the second network entity instructing the second network entity to either negotiate, or not negotiate, a data compression protocol and/or encryption protocol with the communications device. For example, the home agent may instruct the foreign agent to negotiate a PPP level compression protocol with the communications device if it has not already been done. Alternatively, the home agent may instruct the foreign agent to disable PPP compression, i.e., tear down any existing PPP level data compression session with the communications device. Similarly, the home agent may instruct the foreign agent to enable or disable PPP encryption protocols.

In the event that the second network entity is instructed to not negotiate a data compression and/or encryption protocol with the communications device, then data compression and/or encryption is performed by the first network entity. For example, if the home agent instructs the foreign agent to not negotiate PPP layer data compression, then the home agent implements IP layer data compression. As another example, if the home agent instructs the foreign agent to not negotiate PPP layer encryption, then the home agent implements an IP layer encryption algorithm.

In the event that the second network entity is instructed to negotiate a data compression and/or encryption protocol with the communications device, then the second network entity implements a data compression and/or encryption on the data per the instructions. This allows the first network entity to not implement a data compression algorithm or encryption algorithm, whereby data compression or encryption are performed only once under the supervision of the first network entity. The result is that processing power is conserved in the network entity that is relieved of implementing the data compression or encryption algorithm on the data.

In additional to these instructions, the first network entity (e.g., the home agent) can also supply a message to the second network entity (e.g., the foreign agent) telling the second network entity whether the first network entity is enabling or disabling encryption or compression features at a given layer in the OSI reference model, such as the IP layer. This information can be used as a reason indicator or code supplied to the communications device explaining why a lower level encryption or compression protocol negotiation was rejected.

The format or method by which the encryption and compression instruction message is given from the first network entity to the second entity can take many forms. In the wireless network access example of FIG. 1, the message can be appended to a registration reply message sent from the home agent to the foreign agent in response to a registration request message from the foreign agent.

Further, the nature of the communications device in which the invention can be used is not important. In the representative wireless networking example, the communications device can be any mobile wireless communications device.

In one possible embodiment, the second network entity sends a message to the first network entity indicating whether the second network entity is willing to abide by instructions from the first network entity, i.e., whether it is willing to negotiate compression and/or encryption protocols at a given layer (e.g., at the PPP layer). Typically, this message will be given to the first network entity before it sends its instruction message to the second network entity. This allows the second network entity to indicate it is experiencing a high CPU load or otherwise is unwilling to negotiate the compression and encryption protocols. Furthermore, a manifestation of unwillingness to negotiate encryption and, compression protocols at a given level by the second network entity will usually indicate that they must be performed by the first network entity.

BRIEF DESCRIPTION OF THE DRAWINGS

In the following description, reference will be made to the appended drawing figure denoted FIG. 1, which is a schematic illustration of the communications architecture that may be used too link one or more remote terminals connected to a packet-switched network and a user operating a mobile wireless communications device such as a laptop computer equipped with a cellular telephone modem. The home agent controls whether the foreign agent implements PPP-layer encryption and compression algorithms as described in further detail below.

DETAILED DESCRIPTION OF THE PREFERRED AND ALTERNATIVE EMBODIMENTS OF THE INVENTION

Figure 1:
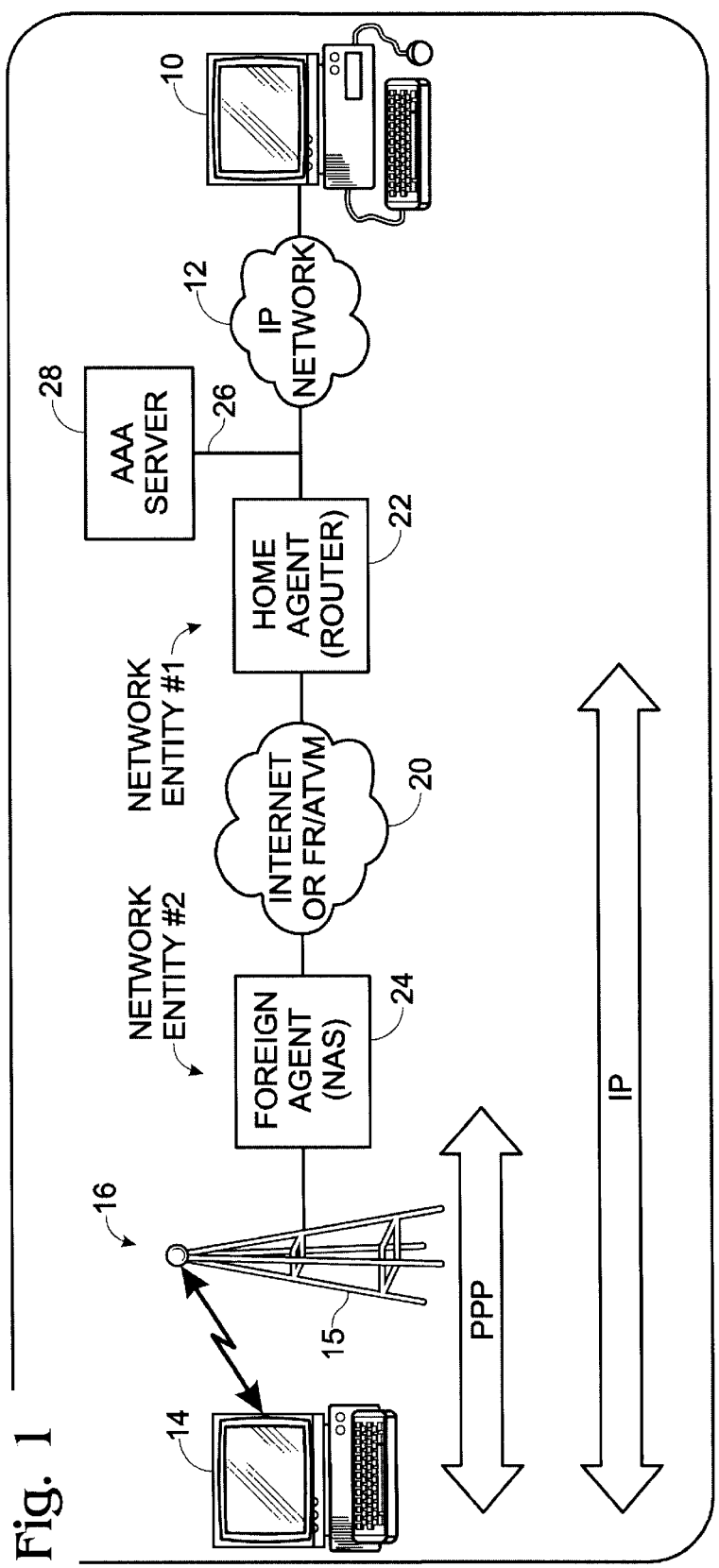

Before describing the particular features and steps of the present inventive method in detail, we will first describe a representative environment in which the invention can be practiced, that is, an environment in which encryption and compression at different network layers in the ISO reference model can be effectively coordinated between different network entities for a given session.

Referring to FIG. 1, a situation in which compression and encryption may take place on several different levels for a wireless network access scenario is illustrated. In FIG. 1, a mobile wireless communications device or station 14 (e.g. a laptop computer with a cellular telephone modem) establishes a link to a radio tower 15 in a wireless communications network 16. The call is forwarded through the wireless network 16 to a network access server 24 functioning as a "foreign agent" for the wireless device. See the publicly available Requests for Comments (RFC) 2002 document for further details, which is fully incorporated by reference herein. The foreign agent 24 terminates a PPP session for the mobile device 14. The foreign agent 24 is connected via either an IP network 20 such as the Internet or a frame relay or asynchronous transfer mode network to a router 22 functioning as a "home agent" for the wireless device 14. The home agent 22 is connected over a local area network 26 to an accounting, authorization and authentication (AAA) server 28, such as a RADIUS server. The home agent is also connected to another IP network 12 to which a host or destination computer 10 is connected.

In the scenario of FIG. 1, a PPP connection exists between the mobile device 14 and the foreign agent 24. Thus, the foreign agent 24 could perform encryption and compression on the data over the PPP link with the wireless device, with the mobile device also performing PPP compression and encryption. Additional protocol layers may also used for the connection between the mobile device and the home agent, for example a Level 2 Tunneling Protocol (L2TP) and an IP protocol, both of which are processed in the home agent 22. If encryption and compression are performed at both the PPP and IP layers, then both the foreign agent and the home agent are burdened with this processing task. This is a redundant and wasteful use of processing power in the network entities.

Platforms that are destined for home agent and foreign agent functionality in the above wireless networking example may be designed specifically for these purposes, or may be legacy systems built for earlier applications. Additionally, as wireless network access systems such as shown in FIG. 1, or other new communications systems, are rolled out the hardware platforms will likely not be uniform insofar as their central processing unit capabilities are concerned. Heretofore, to the inventors' knowledge it has been unknown to manage encryption and compression features such that they are being performed in a coordinated fashion between different network entities. Moreover, it has been unknown to coordinate these features such that they are being performed by the network entity best suited to shoulder the CPU burden that such features require.

The present invention provides a mechanism to coordinate encryption and compression features between two network entities at different levels or layers in the ISO reference model. For example, the present invention provides for coordination of encryption and compression for data en route from the host computer 10 to the mobile station 14 between different network entities, one of which is capable of performing PPP level encryption and compression and the other of which is capable of performing IP level encryption and compression. This coordination eliminates performing encryption and compression twice for the same data stream (which would represent a waste of CPU power and could even result in expansion of the data). It also permits the entity operating the network entities to assign the encryption and compression tasks to the network entities best suited to perform these computationally intensive tasks, e.g., the one that has the greatest CPU capability or with the least CPU burden at a given point in time. The present invention thus allows for the most efficacious application of encryption and compression to be used for a given communications session.

Furthermore, while the invention will be described below in the context of a wireless network access environment for the purposes of illustration, it will be appreciated that the invention is capable of general applicability. The invention can be employed in virtually any situation in which encryption and compression features at different layers or levels can be performed by two different network elements for a single communications session.

Thus, the invention can be implemented in a variety of different scenarios, we will describe it in the context of a wireless networking system as shown in FIG. 1 merely for purposes of illustration and not limitation.

The nature of the mobile wireless communications device 14 is not important. For purposes of illustration, a laptop computer with a wireless modem. is shown in the drawings. However, it could easily be a personal digital assistant, a portable electronic cash register or credit card swipe with a wireless modem, a portable fax machine, or any other type of device or appliance that can be used to access a packet-switched IP network such as network 12 in order to communicate with a remote terminal such as general purpose computer 10. Of course, the details of the network 12 and remote terminal 10 are also not particularly important. Generally speaking, the wireless device will have a suitable known communications software and hardware to establish a Point-to-Point Protocol connection with a device offering network access (i.e., a network access server 24), and communications software to establish an IP layer connection with other network entities such as routers, including a home agent 22.

In the illustrative embodiment of FIG. 1, the Point-to-Point Protocol (PPP) is the layer 2 (Data Link Layer) protocol that is used to connect the wireless unit 14 to the network access. server 24. Since it is a layer 2 protocol, it is dependent upon a layer 1 protocol to provide transport over any network. In a wireless network, the Reliable Link Protocol (RLP) is the protocol used between the mobile device 14 and a base station (not shown) in the wireless network.

The network access server 24 provides Internet Protocol (IP) network access for the wireless device 14 and acts as a "foreign agent" as specified in RFC 2002. Wireless signaling procedures specify how to establish, remove and idle connections within the wireless network 16, that is, from the mobile station 14 to the network access server. Additional details are set forth in RFC 2002 and in the patent application of Richard Dynarski, et al., filed Jan. 19, 1999, now U.S. Pat. No. 6,466,571, both incorporated by reference herein, but are not believed to be pertinent to the present invention.

When an incoming call comes in to the network access server 24, it sends a Registration Request message to the home agent 22. See RFC 2002 for a description of the structure of the registration request message. The foreign agent may be connected to the home agent 22 via an IP network such as a local area network or the Internet 20, or by a Frame Relay or Asynchronous Transfer Mode network, it matters not which. In any event, the home agent forwards the registration request message to its associated Accounting, Authorization and Authentication (AAA) server 28, typically configured as a RADIUS server. The RADIUS server determines whether the user is authorized to access the network. The patent application of Yingchun Xu, et al., filed Jan. 21, 1999, Ser. No. 09/234,922 describes a CHAP-based authentication mechanism for registration authentication. However, procedures as specified in RFC 2002 could also be used.

The AAA server 28 sends back an authentication result message to the home agent 22 informing the home agent 22 whether the registration request has been approved. The home agent 22 then sends a Registration Reply message to the foreign agent 24 advising of the result of the authentication process. (Authentication could also take place in the home agent, instead.) Assuming a positive authentication response in Registration Reply message, the home agent 22 creates a mobile IP tunnel with the foreign agent 24. As mentioned previously, PPP and IP lie in two different layers in the ISO model, each protocol supporting its own data compression and encryption features. Thus, the home agent and foreign agent are two different network entities that are each capable of performing encryption and compression on data transmitted from the host computer 10 to the wireless station 14.

The problem is how to coordinate and control the performance of the encryption and compression between the two network entities, such that preferably only one compression is performed, only one encryption is performed, and that preferably the compression is performed prior to the encryption. To compress twice or encrypt twice, i.e., in both network entities, is a waste of processing power. This is especially true if one or more of the devices is a high density device, such as where the foreign agent 24 provides network access for hundreds of wireless users at the same time. As another example, the network access server 24 may be configured to. provide network access for both wireless and land-based remote computers and have hundreds of ports. When it is operating at maximum capacity its throughput could be lowered substantially if it had to perform PPP-level data compression and encryption for each of the channels. By off-loading the encryption and/or compression tasks to the home agent 22 (or to another suitable network entity such as an IP router), which operates at a higher level (e.g. IP), then the network access server 24 can be more efficiently managed.

As still another example, the network access server 24 may often be one of many network access servers owned by a entity, such as a telephone company, internet service provider, or other business providing network access for remote terminals. In practice, the network access server 24 may be an older generation device that has relatively less processing power relative to other, more recent models of network access servers that are owned by the entity. The operator of the system may program the home agent 22 or the AAA server 28 such that when the older generation network access servers (such as 24) set up their PPP sessions the negotiation of PPP-level encryption and compression features is disabled, while the more recent generation network access servers, with higher processing power, are instructed to enable the PPP-level encryption and compression. The decision could also be based on the particular identity or type of mobile station 14, and be stored as a profile for the mobile station 14 in the AAA server 28. This kind of dynamic, intelligent allocation of load sharing among a home agent and a group of network access servers will lead to greater efficiency and ease of management of the system.

Furthermore, the invention preferably provides a feature whereby the network access server 24 can communicate with the home agent 22 and tell it whether it is willing to perform PPP encryption and compression (e.g., due to load, processing ability, or other reasons). If the foreign agent 24 is not willing or able to perform PPP-level compression and encryption, then the home agent must step in and perform such processing (typically at a higher layer such as at the IP layer).

To provide the coordination and controlling of encryption and compression features as described herein between two different network entities, a message is sent from the first network entity to the second network entity instructing the second network entity to either negotiate, or not negotiate, a data compression protocol or an encryption protocol with the communications device. There are a number of ways in which this message can be structured and sent from the first network entity to the second network entity. In the wireless example of FIG. 1, the home agent 22 receives a Registration Request message from the mobile node 14 via the foreign agent 24 and has to send a Registration Reply message back to the mobile node 14 via the foreign agent 24 indicating whether the Registration Request has been approved or disapproved. The Registration Reply message is a suitable vehicle for containing the instructions to the foreign agent. The Registration Reply message contains an extension field or Type Length Value (TLV)—encoded option that indicates whether the encryption and compression features are to be negotiated (i.e., enabled) between the foreign agent and the mobile station at the PPP layer.

In the event that the second network entity (e.g., foreign agent 24) is instructed to not negotiate a data compression protocol with the communications device, then a data compression algorithm for the data is implemented in the first network entity (the home agent). Similarly, if the second network entity is instructed to not implement an encryption protocol, then the first network entity implements an encryption algorithm on the data.

In the event that the second network entity (e.g., foreign agent) is instructed to negotiate a data compression protocol with the communications device, a data compression algorithm on the data is implemented in the second network entity and the first network entity (e.g., home agent) is relieved of the task of implementing a data compression algorithm.

In this fashion, data compression and encryption are only performed once on the data data, under the control of the first network entity. The processing power in the network entity that does not implement data compression or encryption is preserved.

In the wireless networking example where the first network entity is the home agent and the second network entity is the foreign agent, the process may proceed as follows. The Registration Reply message sent from the home agent to the foreign agent may contain an extension field that is filled in to indicate any, and preferably all, of the following information:

(1) Whether the foreign agent 24 is to enable or disable PPP layer compression for the particular mobile station 14. If the instruction is to enable PPP compression, the foreign agent negotiates a PPP-layer Compression Control Protocol (CCP) with the mobile station if not already done. If the instruction is to disable PPP compression, any CCP session with the mobile station is torn down.

(2) Whether the foreign agent is to enable or disable PPP layer encryption for the particular station. Similarly, if the instruction is to enable PPP layer encryption, then the foreign agent negotiates an Encyption Control Protocol at the PPP layer with the mobile station. If the instruction is to disable PPP layer encryption, the foreign agent tears down any ECP session with the mobile station.

(3) Whether the home agent is enabling or disabling IP-layer Compression. See RFC 2393, incorporated by reference herein, for further details on IP layer compression. This information indicates to the foreign agent the reason for disabling PPP-layer compression. The information can be forwarded to the mobile station 14 as a reason code for the foreign agent not negotiating a PPP-layer compression protocol (CCP).

(4) Whether the home agent is enabling or disabling IP-layer Encryption (IP SEC). See RFC 2393 for further details on IP-layer encryption. This information indicates to the foreign agent the reason for disabling PPP-layer encryption. The information can also be forwarded to the mobile station as a reason code for rejecting an ECP session.

In a preferred embodiment, the Registration Reply message from the home agent to the foreign agent includes at a minimum (1) and (2) above. Information (3) and (4) above is helpful but not absolutely necessary.

As the home agent can negotiate IP-layer encryption and compression sessions between itself and the mobile station, these sessions can be negotiated to have both ends perform compression prior to encryption. As the home agent will establish a trust relationship with the mobile station, it could be responsible for establishing a trust relationship, on behalf of the mobile station, between itself and another entity such as the host computer 10 of FIG. 1 for end-to-end security. Likewise, an IP compression session can be set up to operate between the home agent and the host computer on behalf of the mobile station if required.

There are several possible methods by which the home agent 22 determines how to fill in the registration reply extension with information (1)–(4) above for any given session. In a preferred embodiment, it obtains the information from the AAA server of FIG. 1 as a profile of the mobile station 14 during the registration authentication process performed in the AAA server. As another example, the AAA server may contain a table indicating the computing resources available to the home agent 22 and the foreign agent 24 based on real time load statistics (such as by using a management program for the network entities). When the Registration Request message comes in to the AAA server, the AAA server consults the table and determines the optimum manner of performing encryption and compression for the mobile station based on the load statistics and CPU power available to the home agent and the foreign agent. As a third possibility, the table could be maintained in the home agent and the home agent determines how to control and coordinate compression and encryption without assistance from another device (e.g., AAA server 28).

As a result of the above coordination and control features, e.g., where encryption and compression are provided in the home agent 22 only, redundant PPP-layer compression and encryption processing in the foreign agent 24 is avoided, preserving CPU power in the foreign agent 24. It also helps to insure that encryption and compression are efficiently used at the IP layer. It also allows the operator of the wireless network access system of FIG. 1 the ability to place CPU burdens for encryption and compress on the appropriate entities in the network.

In a preferred embodiment, an earlier message is sent from the second network entity to the first network entity indicating whether the second network entity is willing to negotiate PPP-layer data compression or encryption protocols. This promotes further understanding and coordination between the network entities, and would greatly assist field applications engineers in troubleshooting problems. In the above wireless example, when the registration request message is sent to the home agent, the message includes an extension field containing information as to whether the foreign agent was willing to negotiate PPP-layer encryption and compression features. The foreign agent would determine whether to indicate to the home agent it cannot perform PPP-layer encryption or compression based on factors such as its current load, available processing power, current throughput rate, age or type of device, etc. When the home agent receives the message that the foreign agent is unwilling to perform PPP-layer encryption and compression, then the home agent understands that encryption and compression will have to come from elsewhere, such as from the home agent 22 via IP layer encryption and compression.

Thus, in the preferred embodiment, the Registration Request message sent from the foreign agent to the home agent could have an extension field containing the following informations:

(1) whether the foreign agent is willing to enable PPP layer compression (CCP) with the mobile station;

(2) whether the foreign agent is willing to enable PPP layer encryption (ECP) with the mobile station.

This is an optional feature and need not necessarily be implemented.

Persons skilled in the art will appreciate that numerous modifications may be made to the disclosed embodiments without departure from the spirit and scope of the invention. This true scope and spirit is to found be reference to the appended claims, interpreted in light of the foregoing. Further details on design and operation of the network access server are not considered pertinent to the invention. See Richard Dynarski, et al., U.S. Pat. Nos. 6,272,129 and 5,528,595 to Dale M. Walsh et al., both of which are incorporated by reference herein, for further details on a network access server.

We claim:

1. A method of controlling compression of data exchanged between two different network entities and a communications device, wherein said two different network entities comprise a first network entity and a second network entity comprising a foreign agent for said communications device, wherein said first network entity and said foreign agent comprise a processing unit capable of performing at least one data compression algorithm on said data, the method comprising the steps of:

sending a message from said first network entity to said foreign agent instructing said foreign agent to either negotiate, or not negotiate, a data compression protocol with said communications device;

in the event that said foreign agent is instructed to not negotiate a data compression protocol with said communications device, implementing a data compression algorithm on said data in said first network entity, and in the event that said foreign agent is instructed to negotiate a data compression protocol with said communications device, implementing a data compression algorithm on said data in said foreign agent and not implementing a data compression algorithm on said data in said first network entity, whereby only one of said first network entity and said foreign agent performs a data compression algorithm on said data, under the control of said first network entity, thereby saving processing power in the network entity that does not implement a data compression algorithm on said data.

2. The method of claim 1, wherein said communications device comprises a wireless communications device.

3. The method of claim 2, wherein said first network entity comprises a home agent for said wireless communications device.

4. The method of claim 3, wherein said home agent instructs said foreign agent to either enable or disable a Point-to-Point Protocol layer data compression protocol.

5. The method of claim 1, further comprising the step of sending a message from said foreign agent to said first network entity indicating whether said foreign agent is willing to negotiate said data compression protocol.

6. The method of claim 1, wherein said message sent from said first network entity to said foreign agent further indicates whether said first network entity will negotiate a second data compression protocol with said communications device.

7. The method of claim 6, wherein data compression protocol comprises a Point-to-Point Protocol (PPP) data compression protocol and wherein said second data compression protocol comprises an Internet Protocol (IP) layer compression protocol.

8. The method of claim 1, wherein said foreign agent comprises a network access server coupling said communications device to a packet switched network and said first network entity comprises an Internet Protocol router.

9. The method of claim 1, wherein said message send from said first network entity further comprises an instruction to said second network entity to either negotiate, or not negotiate, an encryption protocol with said communications device.

10. The method of claim 9, further comprising the step of sending a reply message from said foreign agent to said first network entity indicating whether said foreign agent is willing to negotiate said data compression protocol and said encryption protocol.

11. A method of controlling encryption of data exchanged between two different network entities and a communications device, wherein said two different network entities comprise a first network entity and a second network entity comprising a foreign agent for said communications device, wherein said first network entity and said foreign agent comprise a processing unit capable of performing at least one encryption algorithm on said data, the method comprising the steps of:

sending a message from said first network entity to said foreign agent instructing said foreign agent to either negotiate, or not negotiate, an encryption protocol with said communications device;

in the event that said foreign agent is instructed to not negotiate said encryption protocol with said communications device, implementing an encryption algorithm on said data in said first network entity, and in the event that said foreign agent is instructed to negotiate an encryption protocol with said communications device, implementing an encryption algorithm on said data in said foreign agent and not implementing an encryption algorithm on said data in said first network entity, whereby only one of said first network entity and said foreign agent performs an encryption algorithm on said data, under the control of said first network entity, thereby saving processing power in the network entity that does not implement an encryption algorithm on said data.

12. The method of claim 11, wherein said message sent from said first network entity further comprises an instruction to said foreign agent to either negotiate, or not negotiate, a data compression protocol with said communications device.

13. The method of claim 12, further comprising the step of sending a reply message from said foreign agent to said first network entity indicating whether said foreign agent is willing to negotiate said data compression protocol and said encryption protocol.

14. The method of claim 11, wherein said communications device comprises a wireless communications device.

15. The method of claim 14, wherein said first network entity comprises a home agent for said wireless communications device.

16. The method of claim 15, wherein said home agent instructs said foreign agent to either enable or disable a Point-to-Point Protocol encryption protocol.

17. The method of claim 11, further comprising the step of sending a message from said foreign agent to said first network entity indicating whether said foreign agent is willing to negotiate said encryption protocol in accordance with said message.

18. The method of claim 11, wherein said message sent from said first network entity to said foreign agent further indicates whether said first network entity will negotiate a second encryption protocol with said communications device.

19. The method of claim 18, wherein encryption protocol comprises a Point-to-Point Protocol (PPP) encryption protocol and wherein said second encryption protocol comprises an Internet Protocol (IP) layer encryption protocol.

20. A method for controlling implementation of Internet Protocol (IP) and Point-to-Point Protocol (PPP) encryption and compression algorithms, the method implemented in a system comprising a home agent and a foreign agent coupled to a network and terminating a PPP session with a communications device over said network, comprising the steps of:

sending a message from said home agent to said foreign agent instructing said foreign agent to either enable or disable (1) a PPP layer compression protocol, and/or (2) a PPP layer encryption protocol;

including in said message information identifying whether said home agent will negotiate an IP layer data compression protocol and/or an IP layer encryption protocol, and said foreign agent responsively enabling or disabling said PPP layer compression protocol and/or said PPP layer encryption protocol in response to said message.

21. The method of claim 20, wherein said message from said home agent to said foreign agent instructs said foreign agent with respect to both said PPP layer compression protocol and said PPP layer encryption protocol.

22. The method of claim 20, wherein said message is contained in a registration reply message sent from said home agent to said foreign agent.

23. The method of claim 20, wherein said home agent comprises a router.

24. The method of claim 20, wherein said foreign agent comprises a network access server.

25. The method of claim 20, further comprising the step of sending a message from said foreign agent to said home agent indicating whether said foreign agent is willing to enable or disable either said PPP layer compression protocol or said PPP layer encryption protocol.

26. The method of claim 25, wherein said message sent from said foreign agent to said home agent is sent in a registration request message.

27. The method of claim 20, wherein said network comprises a wireless communications network.

\* \* \* \* \*